United States Patent [19]
Banerjee et al.

[11] Patent Number: 5,617,563
[45] Date of Patent: Apr. 1, 1997

[54] DUTY CYCLE INDEPENDENT TUNABLE CLOCK

[75] Inventors: Pradip Banerjee, San Jose; Patrick Chuang, Cupertino; Atul V. Ghia, San Jose, all of Calif.

[73] Assignees: Sony Corporation of Japan; Sony Electronics, Inc., both of Park Ridge, N.J.

[21] Appl. No.: 334,687

[22] Filed: Nov. 4, 1994

[51] Int. Cl.$^6$ .................................................. G06F 1/08
[52] U.S. Cl. .......................................................... 395/556
[58] Field of Search ............................ 395/550; 307/265, 307/269

[56] References Cited

U.S. PATENT DOCUMENTS 5,315,164  5/1994  Broughton ............................. 307/265
5,336,939  8/1994  Eitrheim et al. ........................ 307/269

*Primary Examiner*—Thomas M. Heckler
*Attorney, Agent, or Firm*—Irell & Manella LLP

[57] ABSTRACT

An internal clock that generates a signal from a system clock is provided. The signal generated by the internal clock has a duty cycle that is independent of the system clock. The internal clock may be tuned to provide a desired duty cycle that corresponds to the period required for an operation such as a write to memory. The internal clock may provide a duty cycle that is longer or shorter than the system clock. The signal generated by the internal clock has the same period as the signal generated by the system clock to maintain synchronization of system operations.

20 Claims, 6 Drawing Sheets

DUTY CYCLE INDEPENDENT TUNABLE CLOCK

BACKGROUND OF THE INVENTION

1. Field of the Invention:

The invention relates to the generation of a digital clock signal. More specifically, this invention relates to the generation of a clock signal based upon a system clock signal, where the duty cycle of the generated clock signal may be tuned and is independent of the system clock signal.

2. Art Background:

Many digital systems, including most computers, employ a system clock to synchronize various system operations. Typically, digital systems generate the system clock signal with an oscillator circuit implemented with a crystal. The system clock signal is generally a square wave pulse train where the amplitude of the wave corresponds to the voltage difference between the high and low states of the digital system. The clock signal is an input into various circuits that perform operations during that part of the clock period where the clock signal is at its maximum value, the voltage that corresponds to the high state of the system. The duty cycle of a clock is defined as the ratio of the pulse width which corresponds to the amount of time during which the signal is at a maximum value, to the total period of the clock.

Certain system operations, which may be called sub-systems, may require a different duty cycle than that provided by the system clock. Reads and writes to memory are examples of system operations that may require a longer duty cycle than other operations. For system synchronization, however, it is still desirable to perform all of the system operations, including those operations that require a longer or shorter duty cycle, based upon the system clock. That is, each system operation should be performed within the same period of the clock.

It is not efficient to employ different oscillator circuits for each sub-system that requires a different duty cycle than that provided by the system clock. First, as previously stated, the system must be synchronized. Although certain operations may require a longer or shorter duty cycle, the system should synchronize the start of these various operations such that after one clock cycle, each system has performed its operation. The use of different oscillator circuits would tend to desynchronize the system since the periods of the various oscillators may diverge over time. Further, the use of additional oscillators would increase the cost of the system.

The present invention overcomes the limitations of prior art systems by providing a method and apparatus that generates clock signals with the same period as a system clock but with a longer or shorter duty cycle than that provided by the system clock. Further, as will be described more fully below, the method and apparatus of the present invention allows the duty cycle of the system to be accurately extended or shortened to any desired value.

SUMMARY OF THE INVENTION

The internal clock generator of the present invention accurately extends or shortens a duty cycle of a system clock to any desired percentage. In a preferred embodiment, the rising edge of a signal generated by the system clock changes the state of a flip flop circuit from a low state to a high state. The output of the flip flop circuit is the output of the internal clock. The flip flop remains in a high state for the desired length of time, without regard to the falling edge of the signal provided by the system clock. The flip flop circuit changes from a high state to a low state at the desired time by receiving a timeout signal from a synchronization circuit which in turn receives a signal from a delay circuit. The delay circuit delays the system clock signal for a period corresponding to the desired duty cycle. At the expiration of the delay period, the delay circuit provides the delayed system clock signal to the synchronization circuit, which senses the rising edge of the delayed system clock signal and provides a timeout signal to the flip flop circuit to change the internal clock from a high state to a low state. The cycle repeats each time the system clock signal changes from a low state to a high state. To shorten the duty cycle, the output of the flip flop circuit may be inverted.

DETAILED DESCRIPTION OF THE INVENTION

The present invention discloses methods and apparatus having particular application for providing a duty cycle independent tunable clock. Although the present invention is described with reference to specific circuits, block diagrams, and signals, etc., it will be appreciated by one of ordinary skill in the art that such details are disclosed simply to provide a more thorough understanding of the present invention. It will therefore be apparent to one skilled in the art that the present invention may be practiced without these specific details. In other instances, well known circuits are shown in block diagram form in order not to obscure the present invention unnecessarily.

Figure 1:
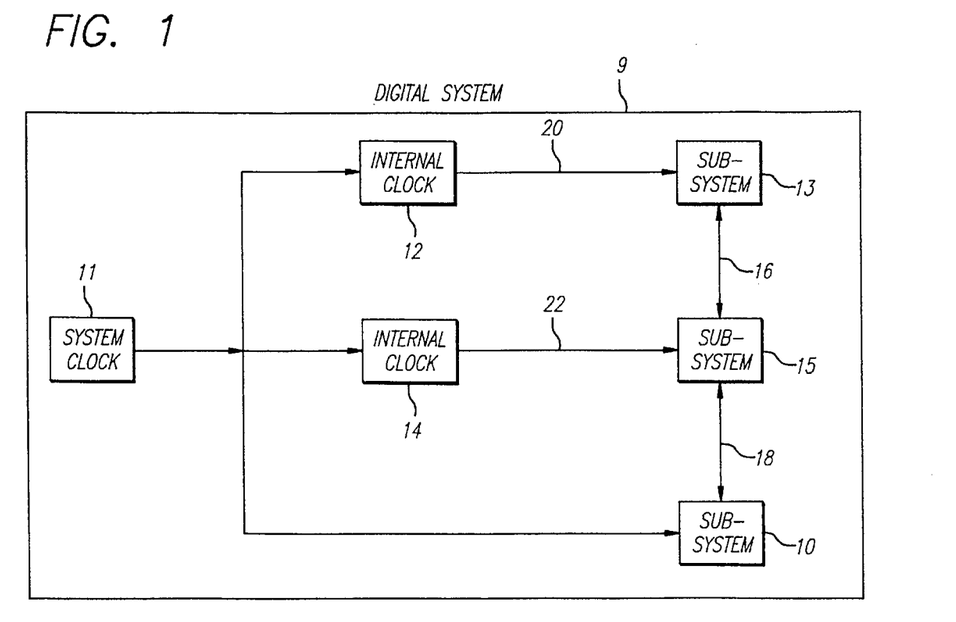
FIG. 1 is a block diagram of a digital system that includes a system clock.

FIG. 1 is a block diagram of a digital system 9, which may comprise a general purpose computer, a digital signal processor or any other digital device. As shown in FIG. 1, the digital system 9 comprises a system clock 11 and digital sub-systems 13, 15 and 10. The digital sub-systems 13, 15 and 10 represent various digital operations. As an example, if the digital system 9 is a general purpose computer, the digital sub-system 10 may comprise an arithmetic logic unit (ALU) while the digital sub-system 15 may comprise a direct memory access device (DMA) and digital sub-system 13 may comprise a shift register memory. The sub-systems may be coupled over lines 16 and 18.

As illustrated in FIG. 1, the system clock 11 synchronizes the various operations performed by sub-systems 13, 15 and 10. Synchronization of the sub-systems 13, 15 and 10 is important in many digital devices. For example, if the digital sub-system 15 comprises a sub-system that writes data to memory, where the data is generated by sub-system 13, the sub-systems must perform their operations sequentially. Digital sub-system 15 must perform its operation after the period that digital sub-system 13 performed its operation while, in turn, digital sub-system 13 must perform a subsequent operation only after digital sub-system 15 has completed its previous operation. Thus, in this example, the sub-systems 13 and 15 must perform and finish their respective operations within the same period, which is the period of the system clock 11. Generally, sub-systems 13, 15 and 10 must use the clock period provided by system clock 11.

The digital sub-systems 13, 15 and 10, as illustrated in FIG. 1, may require different duty cycles than that provided by the system clock 11. For example, if the digital sub-system 15 comprises a direct memory access device (DMA), it may require a greater duty cycle to read or write to or from memory than the duty cycle provided by the system clock 11.

Figure 3:
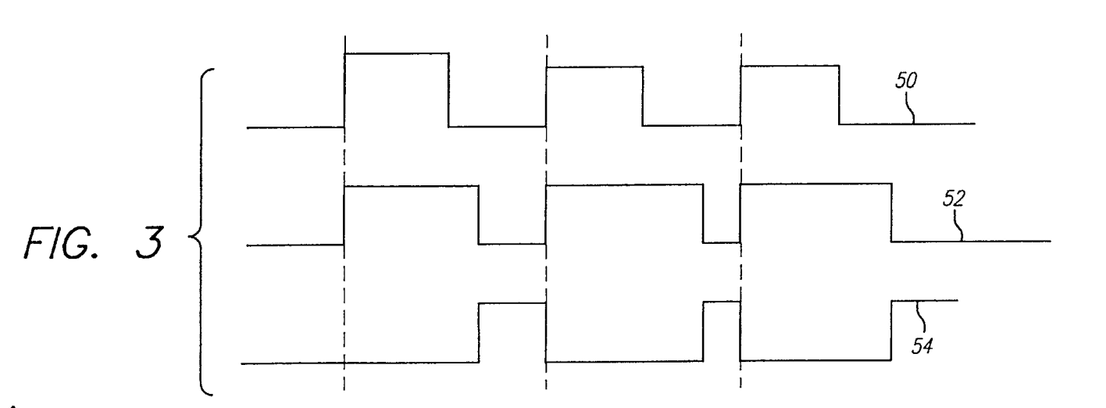
FIG. 3 is a timing diagram of signals with different duty cycles than a system clock but the same period as the system clock.

FIG. 3 illustrates the signals of clocks with identical periods but varying duty cycles. As shown in FIG. 3, pulse train 50 represents a signal provided by the system clock 11 while pulse train 52 represents a signal provided to the sub-system 13 that requires a longer duty cycle than the system clock 11 while pulse train 54 represents a pulse train provided to the sub-system 15 that requires a shorter duty cycle than system clock 11. As illustrated in FIG. 3, the pulse trains 52 and 54 have longer and shorter duty cycles, respectively, than the pulse train 50 of the system clock 11. All three pulse trains 50, 52 and 54, however, have the same period and each sub-system completes its operations during the duty cycle in each period. Thus, the system remains synchronized even though the sub-systems require varying duty cycles to perform their respective operations.

The present invention provides the digital sub-systems 13 and 15 with a clock signal that has the proper duty signal for each sub-system. As shown in FIG. 1, the present invention, an internal clock generator, is represented by blocks 12 and 14 which are interposed between the sub-systems 13 and 15 respectively. Sub-system 10 requires the same duty cycle as that provided by the system clock 11 and thus is directly provided with the signal of the system clock 11. An internal clock generator 12 is coupled to sub-system 13 and system clock 11 and provides sub-system 13 with a clock signal over line 20 that has the duty cycle required by digital sub-system 13. Similarly, internal clock generator 14 is coupled to sub-system 15 and system clock 11 and provides sub-system 15 with a clock signal over line 22 that has the duty cycle required by sub-system 15. The digital system 9 remains synchronized because internal clock generators 12 and 14 provide the sub-systems 15 and 10 with clock signals that have the same overall period as that of the system clock 11.

Figure 2:
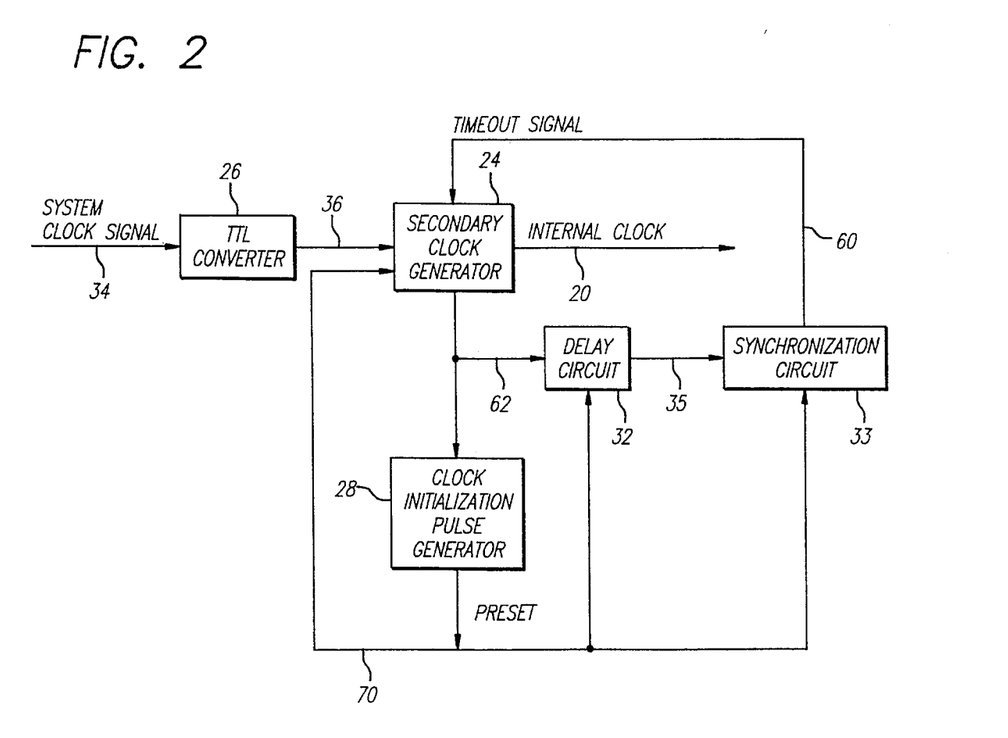
FIG. 2 is a block diagram of the clock generator of the present invention.

FIG. 2 is a block diagram of the internal clock generator 12. As illustrated in FIG. 2, the internal clock generator 12 comprises a secondary clock generator 24 coupled to a TTL converter 26, clock initialization pulse generator 28, delay circuit 32, and synchronization circuit 33. Internal clock generator 12 receives the signal from the system clock 11 over line 34 and provides sub-system 13 with an internal clock signal over line 20.

In many digital systems, the system clock 11 generates a signal compatible with transistor-transistor logic (TTL) circuits. In a preferred embodiment, the system of the present invention converts the signal provided by the system clock 11 into an internal clock signal compatible with metal oxide semiconductor (MOS) technology. Thus, the internal clock generator 12 must convert the TTL compatible signal provided over line 34 to a MOS compatible signal. As shown in FIG. 2, TTL convertor 26 receives the system clock signal over line 34 and provides a MOS compatible signal to secondary clock generator 24 over line 36.

Still with reference to FIG. 2, internal clock generator 12 generates a pulse train with the same period but different duty cycle than that provided by system clock 11. Internal clock generator 12 maintains the same period as system clock 11 by changing from a low state to a high state when system clock 11 changes from a low state to a high state. As used in this Specification, the term "high state" of "high voltage level" corresponds to the voltage of a binary system that indicates a "one", while the term "low state" corresponds to the voltage of binary system that indicates a "zero." Different systems use different voltages and as will readily be appreciated by a person of ordinary skill in the art, the present invention may be used in conjunction with systems that utilize any voltages for the "one" and "zero" values.

As shown in FIG. 3, pulse train 52, which is provided by internal clock generator 12 to sub-system 13, changes from a low state to a high state when the pulse train 50 provided by system clock 11 changes from a low to high state. The signal 52 provided by internal clock generator 12, however, as shown in FIG. 3, does not change from a high to low state when the signal 50 provided by system clock 11 changes from a high to low state. By commencing a new cycle on the rising edges of the system clock 11 but ignoring the falling edges of system clock 11, the internal clock generator 12 generates a clock signal with the same period but different duty cycle than system clock 11.

The internal clock generator 12 generates the duty cycle independent pulse train 52, as illustrated in FIG. 3, by changing from a low state to a high state upon sensing the rising edge of the signal provided by system clock 11 but not changing back to a low state until a preselected delay has elapsed. Referring once again to FIG. 2, secondary clock generator 24 switches to a high state upon sensing a rising edge of the signal provided by system clock 11 and provides a corresponding high signal over line 20 to sub-system 13. The signal provided over line 20 remains high until secondary clock generator 24 receives a timeout signal over line 60 from synchronization circuit 33. Upon receiving the timeout signal from synchronization circuit 33, secondary clock generator 24 provides a low signal to sub-system 13 over line 20 until the signal provided by system clock 11 switches from a low state to a high state at the start of a new clock period.

Thus, the period between the rise of the signal provided by system clock 11 and the timeout signal provided by synchronization circuit 33 corresponds to the duty cycle of the internal clock generator 12. The timeout signal is generated by the synchronization circuit 33, which receives a delayed version of the signal provided by the system clock 11 from delay circuit 32. The delay circuit 32 receives the MOS converted system clock signal over line 62. The delay provided by delay circuit 32 may be easily tuned for the duty cycle required by sub-system 13, as will be described more fully below. After the delay period, the delay circuit 32 provides a signal with a rising edge to synchronization circuit 33, which, in turn, provides a timeout signal to secondary clock generator 24 to change the signal over line 20 from a high state to a low state, as previously described.

Still with reference to FIG. 2, the internal clock generator 12 employs a clock initialization pulse generator 28 to rapidly change the signal provided over line 20 to sub-system 13 from a low state to a high state. As previously described, secondary clock generator 24 provides a high signal over line 20 upon sensing the rising edge of the signal provided by the system clock 11 over line 34. Clock initialization pulse generator 28 decreases the time required for secondary clock generator 20 to provide a signal that changes from a low state to a high state. The clock initialization pulse generator 28 receives a version of the signal provided by the system clock 11 and provides a preset signal to secondary clock generator 24 over line 70. The preset signal causes the secondary clock generator 24 to provide a high signal over line 20. The circuitry comprising clock initialization pulse generator 28 will be described more fully below.

To shorten the duty cycle, the secondary clock generator 24 inverts the signal provided over line 20. Returning to FIG. 3, pulse train 52 corresponds to the pulse train generated by providing a high signal upon sensing the rising edges of pulse train 50 provided by system clock 11 and switching from a high state to a low state upon receiving the timeout signal from synchronization circuit 33, as shown in FIG. 2. Returning to FIG. 3, pulse train 54 represents an inverted version of pulse train 52. Thus, if a sub-system requires a duty cycle shorter than that of the signal provided by system clock 11, signal 52 is generated as previously described and the inverse of signal 52, which is shown in FIG. 3 as signal 54, is provided to the sub-system. If a sub-system requires complementary signals, such as signals 52 and 54, the same internal clock generator may generate both signals which are provided to the sub-system over two separate lines.

Figure 4:
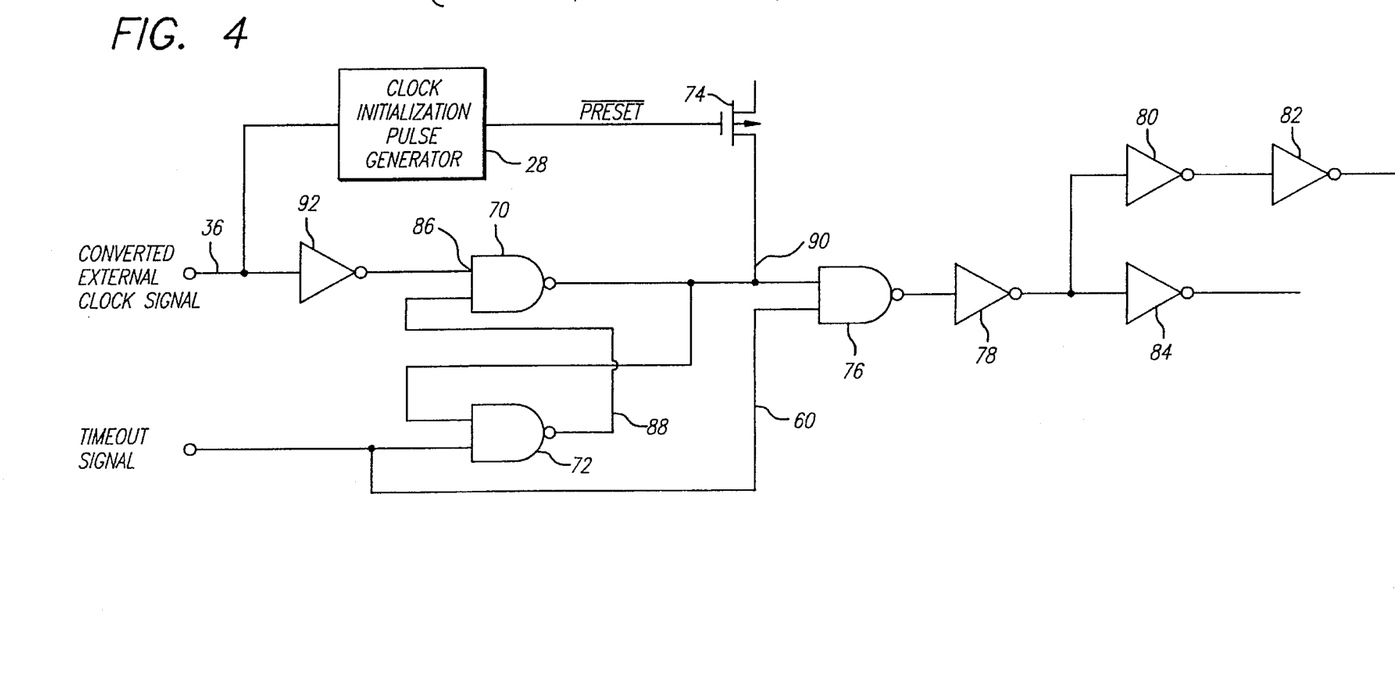
FIG. 4 is a circuit diagram of a secondary clock generator, which provides a clock signal with a duty cycle that is independent of the system clock.

Turning to the implementation of the internal clock generator 12, in a preferred embodiment as shown in FIG. 4, internal clock generator 12 comprises MOS gates. As will readily be appreciated by one of ordinary skill in the art, other digital technologies may be employed to implement internal clock generator 12.

FIG. 4 shows a circuit implementation of the secondary clock generator 24. Before the signal provided by the system clock 11 changes from a low state to a high state, the timeout signal over line 60 is low and the output of nand gate 76 is accordingly high. Thus, the output of inverter 82 is low while the output of inverter 84 is high. Since line 60 is low, the output of nand gate 72 over line 88 is high. While the system clock 11 provides a low value over line 36, inverter 92 inverts the low value on line 36 and provides a high value on line 86 to one input of nand gate 70. A flip flop circuit, also known as a trigger circuit, comprising nand gates 70 and 72 thus provides a low output on line 90 since both inputs to nand gate 70 are high.

A TTL converted pulse train from the system clock 11 is provided to the inverter 92 over line 36, as shown in FIG. 4. The pulse train is also provided to the clock initialization pulse generator 28. A pull up transistor 74 receives the preset signal from the clock initialization pulse generator 28 as shown in FIG. 4. Still with reference to FIG. 4, the rising edge of a pulse provided by system clock 11 causes clock initialization pulse generator 28 to provide a signal with a low value to the p-type pull up transistor 74, which quickly provides a "high" voltage level on line 90. Returning briefly to FIG. 2, as will be described more fully below, upon sensing a rising edge of system clock 11, clock initialization pulse generator 28 provides synchronization circuit 33 with a preset signal which causes the signal on line 60 to change to a high state. Returning to FIG. 4, since lines 60 and 90 are at a high voltage level, the output of the nand gate 76 is driven low and the output of inverter 82 accordingly changes from low to high. Inverter 82 provides the internal clock signal to sub-system 13.

Inverter 82 remains at a high state until the synchronization circuit 33 provides a timeout signal over line 60. The output of nand gate 76 remains low and the output of inverter 82 remains high even after the signal provided over line 36 changes from a high state to a low state. That is, the internal clock provides a high state after the system clock 11 has changed its output from a high state to a low state. When the signal over line 36 changes from a high state to a low state, the inverter 92 provides a high state to nand gate 70. Since line 88 is at a low state, the output of nand gate 70 remains high and the output of nand gate 76 accordingly remains low. The output of inverter 82 is correspondingly high.

The output of nand gate 76 does not change until the synchronization circuitry 33 provides a timeout signal over line 60. After the period desired for the duty cycle has expired, the synchronization circuit 33 provides a timeout signal that changes the voltage on line 60 from a high state to a low state. This timeout signal causes the output of nand gate 76 to change to a high state, and correspondingly causes the output of inverter 82 to change to a low state. The low state on line 60 also causes the output of nand gate 72 to change to a high state. At this point, both inputs of nand gate 70 are high and the output of nand gate 70 correspondingly is driven low. The system remains in this state until the commencement of the next period of the system clock 11 when the signal provided over line 36 changes from a low state to a high state. In this manner, internal clock generator 12 provides a signal with the same period but longer duty cycle than system clock 11. If a shorter duty cycle is required, the inverse of the nand gate 82, which is provided by inverter 84 as shown in FIG. 4, may be used as the output signal of the internal clock generator 12.

Figure 5:
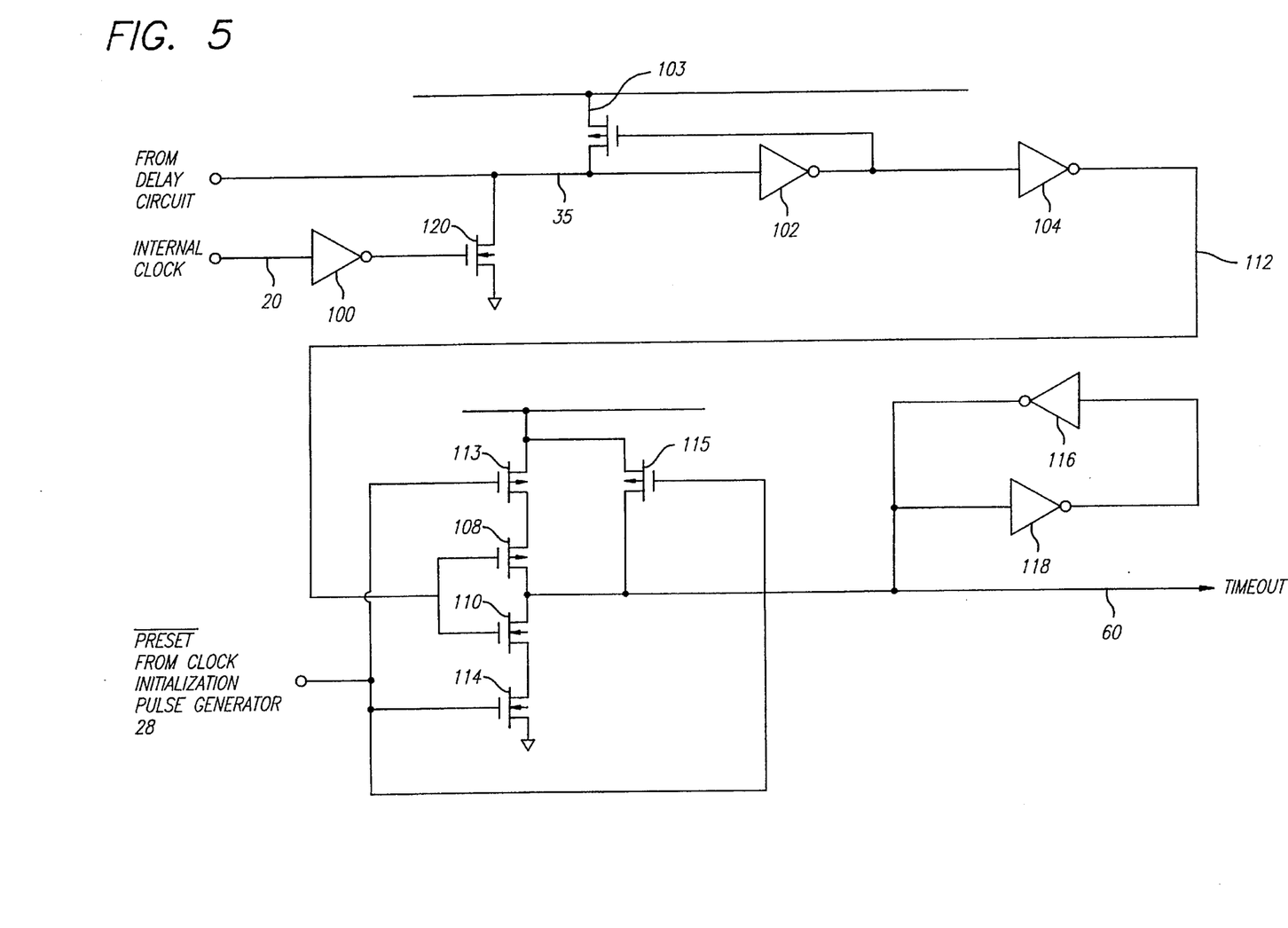
FIG. 5 is a circuit diagram of a synchronization circuit that provides a signal to the secondary clock generator to change the output of the secondary clock generator.

Turning to the generation of the timeout signal over line 60, the synchronization circuit 33 changes the timeout signal over line 60 from a high state to a low state after the desired delay has expired. As shown in FIG. 2, the delay circuit 32 provides a signal over line 35 to synchronization circuit 33. FIG. 5 illustrates the synchronization circuit 33, which receives the delayed clock signal over line 35 and changes the timeout signal over line 60 from a high state to a low state.

Before the synchronization circuit 33 receives the delayed clock signal, the timeout signal over line 60 is in a high state. Before the delayed clock signal is provided over line 35, line 35 is in a low state which causes the output of inverter 102 to be in a high state and the output of inverter 104 to be in a low state. The transistors 108, 110, 113, 114 and 115 comprise a tristate circuit. Gates of p-type transistor 108 and n-type transistor 110 are coupled to the output of inverter 104 over line 112 and are thus in a low state. The inverse of the preset signal provided by clock initialization pulse generator 28 to gates of p-type transistors 113 and 115 and n-type transistor 114 is high before synchronization circuit 33 receives the delayed clock signal over line 35. The high value at the gates of transistors 113, 115 and 114, in combination with the latch comprising inverters 116 and 118 causes the timeout signal over line 60 to remain in a high state.

Upon sensing the rising edge of the delayed clock signal over line 35, the output of inverter 104 changes from a low state to a high state and thus line 112 is in a high state. P-type transistor 103 helps pull line 35 to a high state. The high state of an intermediate signal over line 112 is provided to the gates of transistors 108 and 110 which causes the timeout signal over line 60 to go low and inverters 116 and 118 latch the value over line 60. To reinitialize synchronization circuit 33 for the next period of system clock 11, the gates of transistors 108 and 110 must be reset to a low value. To reset the synchronization circuit 33, the internal clock signal is provided to inverter 100 over line 20. When the internal clock changes from a high state to a low state, the output of inverter 100 is driven high which causes the gate of n-type transistor 120 to be turned on. The high state at gate 120 causes the line 35 to change to a low state, which in turn causes line 112 to change from a high state to a low state. Thus, the gates of transistors 108 and 110 are provided with a low state and do not change to a high state until the synchronization circuit receives the next delayed rising edge provided by system clock 11.

As shown in FIG. 5, the timeout signal over line 60 remains in a low state until clock initialization pulse generator circuit 28 senses the next rising edge of the signal provided by system clock 11. The inverse of the preset signal provided by clock initialization pulse generator 28 is provided to the gates of transistors 113, 114 and 115 and changes the state at the gates of transistors 113, 114 and 115 from a high state to a low state. The low state at gates 113, 114, and 115 causes the timeout signal to change from a low state to a high state. Inverters 116 and 118 latch the state over line 60. As previously described, the timeout signal changes from a high state to a low state only after the synchronization circuit detects the rising edge of the signal provided by delay circuit 33. The transistors 108, 110, 113, 114 and 115 ensure that the timeout signal remains high after the inverse of the preset signal changes from a low state to a high state.

Figure 6:
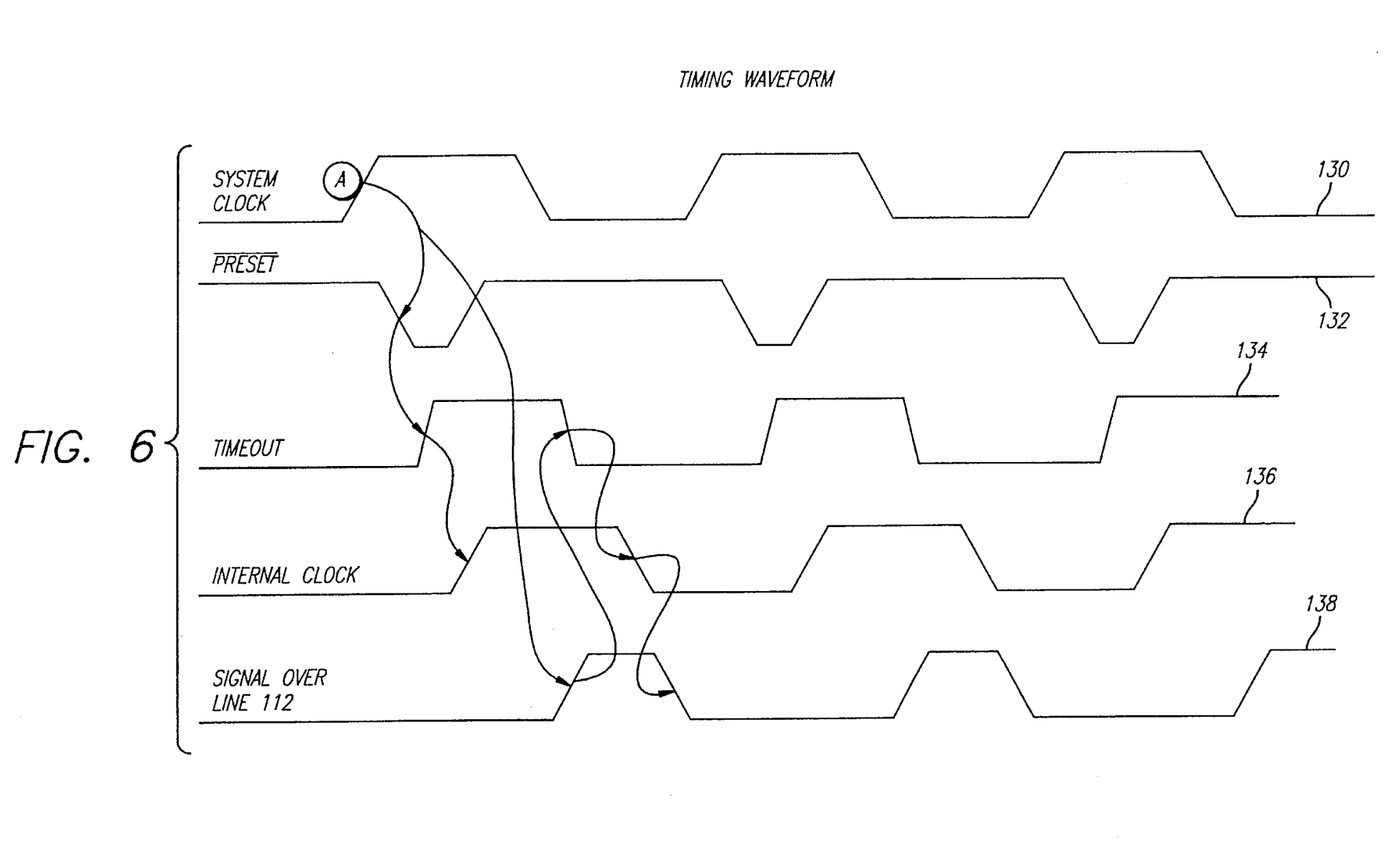
FIG. 6 is a timing diagram of the synchronization circuit.

FIG. 6 is a timing diagram of the synchronization circuit. Signal 130 represents the signal provided by the system clock 11 after conversion by TTL converter 26. Signal 132 represents the inverse of the signal provided by clock initialization pulse generator 28. The inverse of the signal provided by clock initialization pulse generator 28 changes from a high state to a low state upon the rising edge of the signal 130 provided by system clock 11. The change in signal 132 from a high state to a low state causes the timeout signal, as represented by signal 134, to go high. When the timeout signal 134 changes from a low state to a high state, internal clock signal 136 changes from a low state to a high state.

Still with reference to FIG. 6, signal 138 represents the signal provided over line 112 as shown in FIG. 5. Signal 138 changes from a low state to a high state when the synchronization circuit senses the rising edge of the signal provided by delay circuit 32. This causes the timeout signal 134 to change from a high state to a low state which in turn causes the internal clock signal 136 to change from a high state to a low state. Finally, to reinitialize synchronization circuit 33 for the next system clock period, the falling edge of internal clock signal 136 causes signal 138 to change from a high state to a low state.

The delay circuit 32 as shown in FIG. 2 generates the appropriate delays based upon the system function to be performed. For example, if the system function is a memory flush operation, the delay circuit 32 delays the clock signal for the amount of time required for the sub-system to flush the memory area being written to and then actually writing to that area. After this amount of time has elapsed, the delay circuit 32 provides the synchronization circuit 33 with the delayed signal of the system clock 11.

Figure 8:
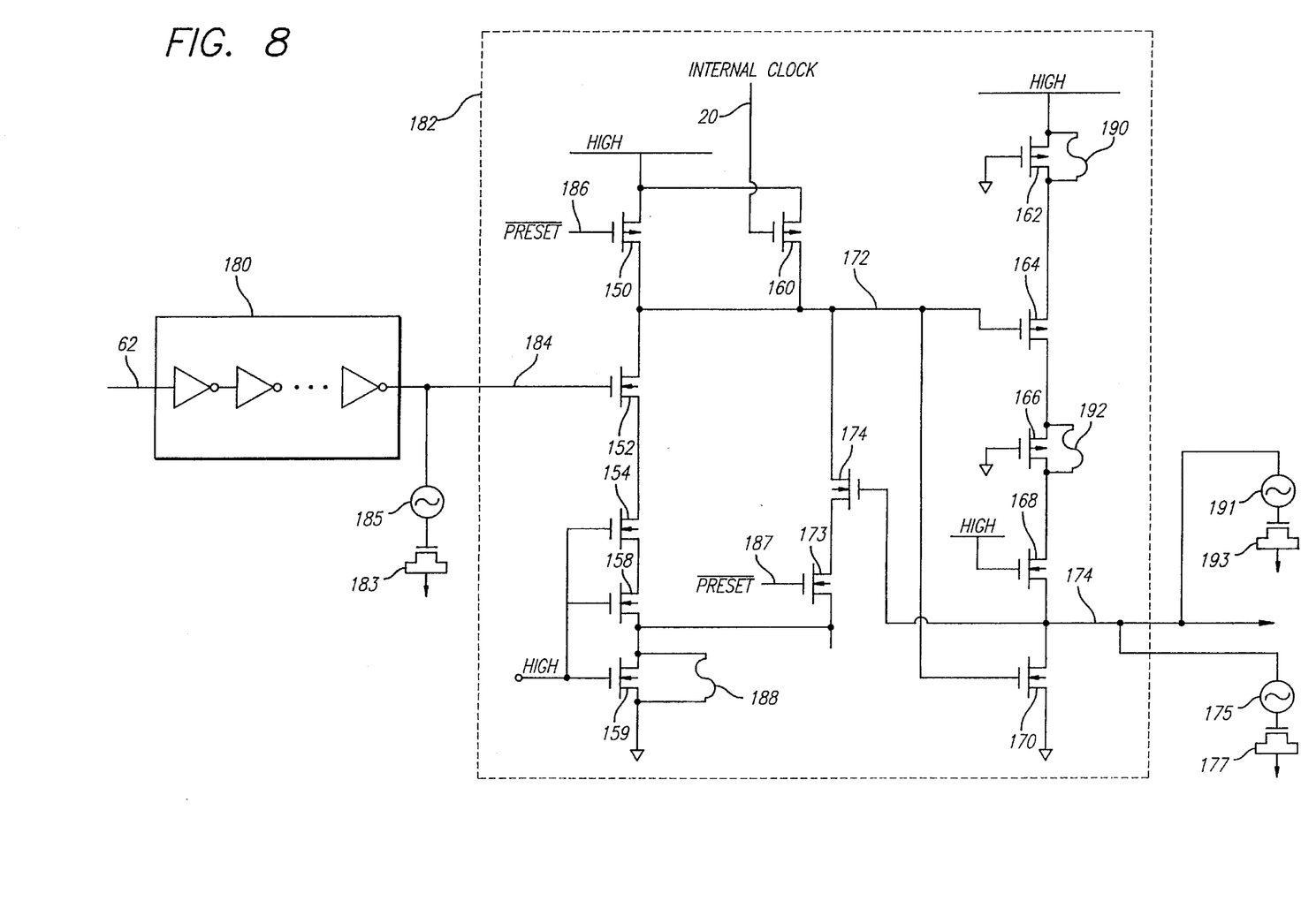
FIG. 8 is a circuit diagram for a delay circuit.

As will readily be appreciated by one of ordinary skill in the art, the delay circuit 32 may comprise various well known delay circuits. As illustrated in FIG. 8, in the preferred embodiment, the delay circuit 32 comprises two separate delay circuits, inverter delay circuit 180 and switch delay circuit 182, connected in series. The inverter delay circuit 180 receives a version of the signal provided by the system clock 11 over line 62. The inverter delay circuit 180 may emulate the delay of a flush cycle for a memory while the switch delay circuit 182 may emulate the delay of a write operation to a memory circuit. The inverter delay circuit 180 comprises a series of inverters, which provide a delay directly proportional to the number of inverters in the inverter delay circuit 180. The inverter delay circuit 180 is coupled to the switch delay circuit 182 and provides the switch delay circuit 182 with a delayed version of the signal provided by the system clock As illustrated in FIG. 8, the switch delay circuit 182 provides an output over line 35 to the synchronization circuit 33. As previously described, the output of the delay circuit 32 over line 35 must change from low to high after the delay circuit 32 receives a clock pulse that changes from low to high. The switch delay circuit 182 as shown in FIG. 8 comprises essentially two switches that change the state over line 35 from low to high upon receiving the delayed signal from the system clock 11 over line 184. One switch comprises n-type transistors 152, 154, 158 and 159 and p-type transistor 150 and the other switch comprises p-type transistors 162, 164 and 166 and n type transistors 168 and 170. The gates of transistors 154, 158, 159 and 168 are coupled to a constant high voltage ($V_{cc}$) line while the gates of transistors 162 and 166 are grounded.

Before the switch delay circuit 182 receives the rising edge of the signal provided by the system clock 11 over line 184, the gate of transistor 152, which is coupled to the inverter delay circuit 180 over line 184, is in a low state. The gate of transistor 150, which is coupled to line 186 that provides the inverse of the preset signal, is in a high state and the gate of transistor 160, which is coupled to the internal clock over line 20, is in a low state. Thus, the line 172 is in a high state. When the rising edge of the signal provided by system clock 11 is provided to the gate of transistor 152, line 172 changes to a low state.

The high to low transition over line 172 changes the output over line 35, the desired output, from low to high. When line 172 is high, the output over line 35 goes low. When the value on line 172 changes from high to low when the switch delay circuit 182 is provided the rising edge of the system clock 11 signal, as previously described, the state of line 35 must change from low to high to prevent current from flowing through the p-type transistor 164. Line 35 is coupled back into the gate of n-type transistor 174, which, in combination with n-type transistor 173, speeds up the transition of the switch over line 172 from high to low as line 35 changes from low to high. The gate of transistor 173 receives the inverse of the preset signal over line 187.

To reset the value over line 35 from a high state to a low state before the next clock cycle, the internal clock is coupled to the gate of p-type transistor 160. When the internal clock changes from a high state to a low state, coupled to the gate of p-type transistor 160. When the internal clock changes from a high state to a low state, transistor 160 pulls line 172 from a low state to a high state. The high state on line 172 causes line 35 to change to a low state.

The switch delay circuit 182 thus provides a delay that is dependant upon the switching time of the switch comprising transistors 150, 152, 154, 158 and 159 and the switch comprising transistors 162, 164, 166, 168 and 170. As shown in FIG. 8, transistors 159, 162 and 166 are shorted through fuses 188, 190 and 192 and thus do not affect the delay provided by switch delay circuit 182. The fuses 188, 190 and 192 may be severed by a laser or other device to increase the delay provided by switch delay circuit 182. Alternatively, capacitors 177, 183 and 193 with fusible links 175, 185 and 191 may be removed by severing fuse links 175, 185 and 191 to decrease the delay of switch delay circuit 182.

Figure 7:
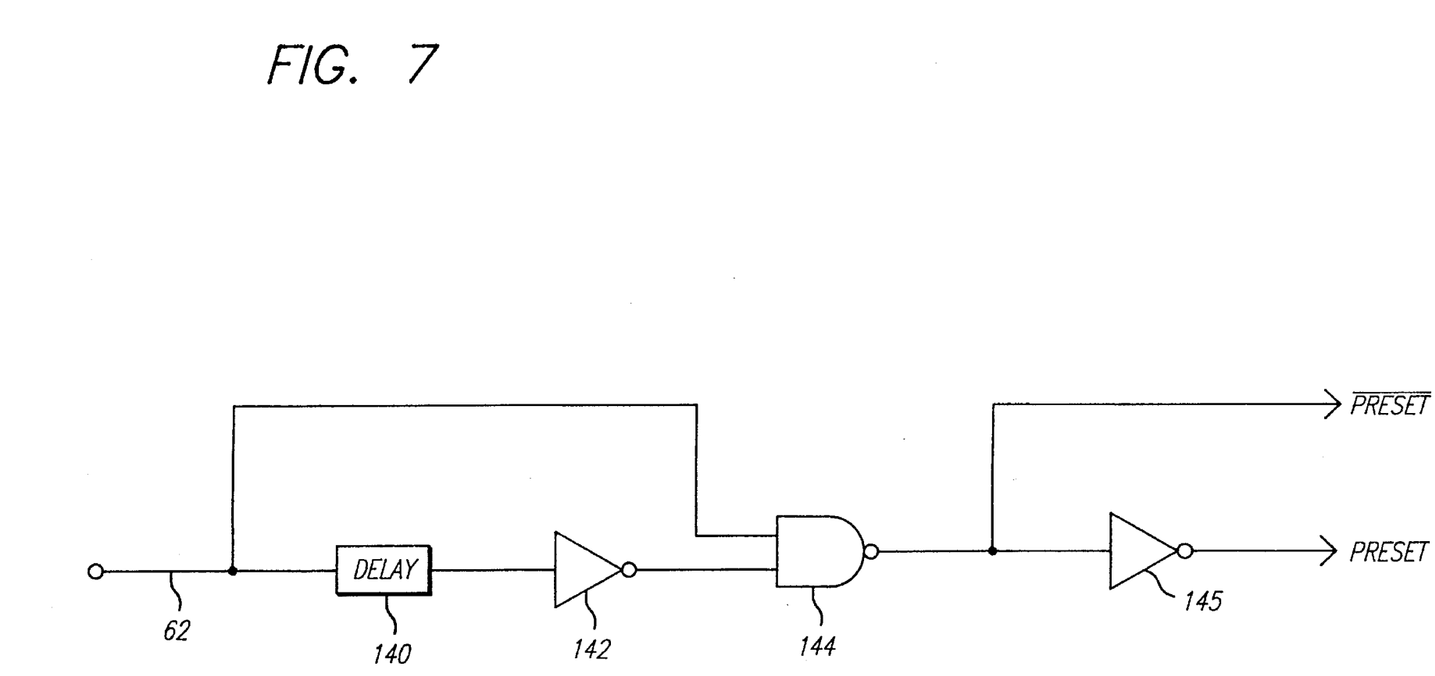
FIG. 7 is a circuit diagram for a clock initialization pulse generator, which provides a pulse upon sensing a rising edge of the system clock.

FIG. 7 illustrates clock initialization pulse generator 28, which generates the preset signal and the inverse of the preset signal. Clock initialization pulse generator receives the converted system clock signal over line 62. This causes one input of nand gate 144 to be driven high immediately after the system clock signal over line 62 changes from a low value to a high state. The delay circuit 140 delays the signal provided to inverter 142 such that inverter 142 receives a low signal before the delay period has expired. Thus, the output nand gate 144 is low. The output of nand gate 144 is the inverse of the preset signal, and the output of inverter 145 is the preset signal. Thus, the preset signal changes from low to high and the inverse of the preset signal changes from high to low when clock initialization pulse generator 28 senses a rising edge of the signal provided by system clock 11.

When the delay circuit 140 provides the rising edge to the input of inverter 142, one input at nand gate 144 changes from high to low, and the preset signal accordingly changes from high to low and the inverse of the preset signal changes from low to high.

While the invention has been described in conjunction with the preferred embodiment, it is evident that numerous alternatives, modifications, variations and uses will be apparent to those skilled in the art in light of the foregoing description. For example, the invention may be applied to systems that use transistor-transistor-logic (TTL) circuits and may also be applied to analog systems. The system clock may generate a sinusoidal or other type of signal. Further, the delay circuit may comprise a variety of well known devices or a separate oscillator may replace the delay circuit. Instead of sensing a rising edge of a system clock, a falling edge may control the timing of the internal clock. Many other adaptations of the present invention are possible.

We claim:

1. A method for generating an internal clock signal from a system clock, said method comprising the steps of:
   preselecting a duty cycle period;
   sensing an amplitude change in a signal generated by said system clock;
   changing the amplitude of an output signal of a circuit coupled to said system clock from a first state to a second state after sensing said amplitude change in the signal generated by said system clock; and
   changing the amplitude of the output signal from the second state to a different state after an amount of time defined by the duty cycle period has elapsed from the time of said amplitude change from the first state to the second state
   wherein said circuit comprises a flip-flop.

2. The method of claim 1 wherein said step of changing said amplitude of the output signal from the second state to the different state includes changing the amplitude from the second state to the first state.

3. The method of claim 1 wherein said step of sensing an amplitude change in the signal provided by the system clock includes sensing a rising edge of the signal provided by the system clock.

4. The method of claim 1 wherein said step of changing the amplitude of the output signal from the second state the different state further includes:
   delaying a version of the signal provided by the system clock for an amount of time defined by said duty cycle period;
   applying said delayed version of said signal provided by the system clock to a triggering device;
   changing the amplitude of the output signal from the second state to the different state after the application of the delayed version of the signal provided by the system clock to the triggering device.

5. The method of claim 1 further including:
   inverting said output signal so that the duty cycle period of said output signal is shorter than a duty cycle period of said signal.

6. An apparatus for generating an internal clock signal from a system clock, said apparatus comprising:
   a trigger circuit for changing an amplitude of an output signal of said trigger circuit from a first state to a second state, a first input of said trigger circuit coupled to said system clock; and
   a delay circuit coupled to a second input of said trigger circuit, said delay circuit providing a signal to said trigger circuit after a predetermined delay such that the output of said trigger circuit changes from the second state to a different state
   wherein said trigger circuit comprises a flip-flop.

7. The apparatus of claim 5 wherein said flip-flop comprises two cross coupled nand gates, said system clock coupled to a first of said two cross coupled nand gates and said delay circuit coupled to a second of said cross coupled nand gates.

8. The apparatus of claim 6 further comprising a sensor for sensing an amplitude change in a signal generated by said system clock.

9. The apparatus of claim 8 wherein said sensor further comprises pulse generator means for generating a pulse upon sensing a rising edge of said signal provided by said system clock, an output of said pulse generator means coupled to a third input of said trigger circuit.

10. The apparatus of claim 6 wherein an input of said delay circuit is coupled to said system clock.

11. The apparatus of claim 10 wherein said delay circuit comprises a plurality of inverters.

12. The apparatus of claim 11 wherein said delay circuit further comprises a first switch, a first input of said first switch coupled to the output of said plurality of inverters.

13. The apparatus of claim 12 wherein said first switch comprises at least one n-type metal oxide semiconductor (MOS) transistor and at least one p-type MOS transistor.

14. The apparatus of claim 12 wherein a second input of said first switch is coupled to the output of said trigger circuit.

15. The apparatus of claim 14 further comprising pulse generator means for generating a pulse upon sensing a rising edge of said signal provided by said system clock, an output of said pulse generator means coupled to a third input of said first switch.

16. The apparatus of claim 12 further comprising a second switch, an input of said second switch coupled to an output of said first switch.

17. The apparatus of claim 16 further comprising a tri-state circuit, an input to said tri-state circuit coupled to an output of said second switch, an output of said second switch coupled to the second input of said trigger circuit.

18. An apparatus for generating an internal clock signal from a system clock, said apparatus comprising:

trigger circuit means for changing an amplitude of an output signal of said trigger circuit means from a first state to a second state, said trigger circuit means coupled to said system clock; and delay circuit means coupled to said trigger circuit means, said delay circuit providing a delay signal after a predetermined delay such that the output of said trigger circuit changes from the second state to a different state wherein said trigger circuit means comprises a flip-flop.

19. The apparatus of claim 18 further comprising synchronization circuit means coupled to said delay circuit means, said synchronization circuit means comprising:

receiving means for receiving the delay signal from said delay circuit means; and output means coupled to said trigger circuit means, said output means providing a timeout signal to said trigger circuit means when said receiving means senses the delay signal.

20. The apparatus of claim 19 further comprising pulse generator means for generating a pulse upon sensing a rising edge of said signal provided by said system clock, said pulse generator means coupled to said synchronization circuit means, said trigger circuit means and said delay circuit means.

* * * * *